No. 730,950. PATENTED JUNE 16, 1903.
P. T. J. MONSON.
CORN PLANTER.
APPLICATION FILED DEC. 4, 1901.
NO MODEL. 3 SHEETS—SHEET 1.
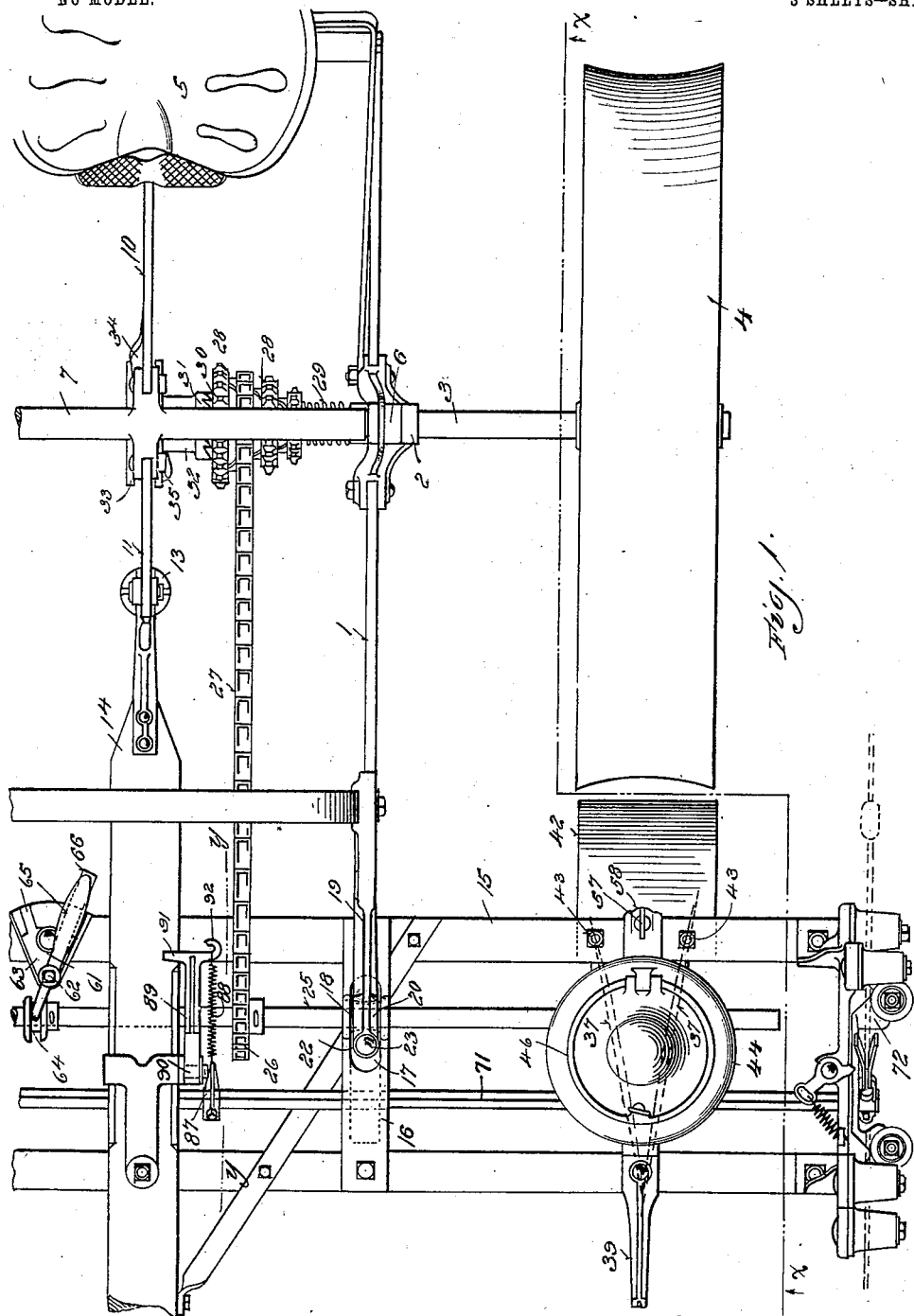

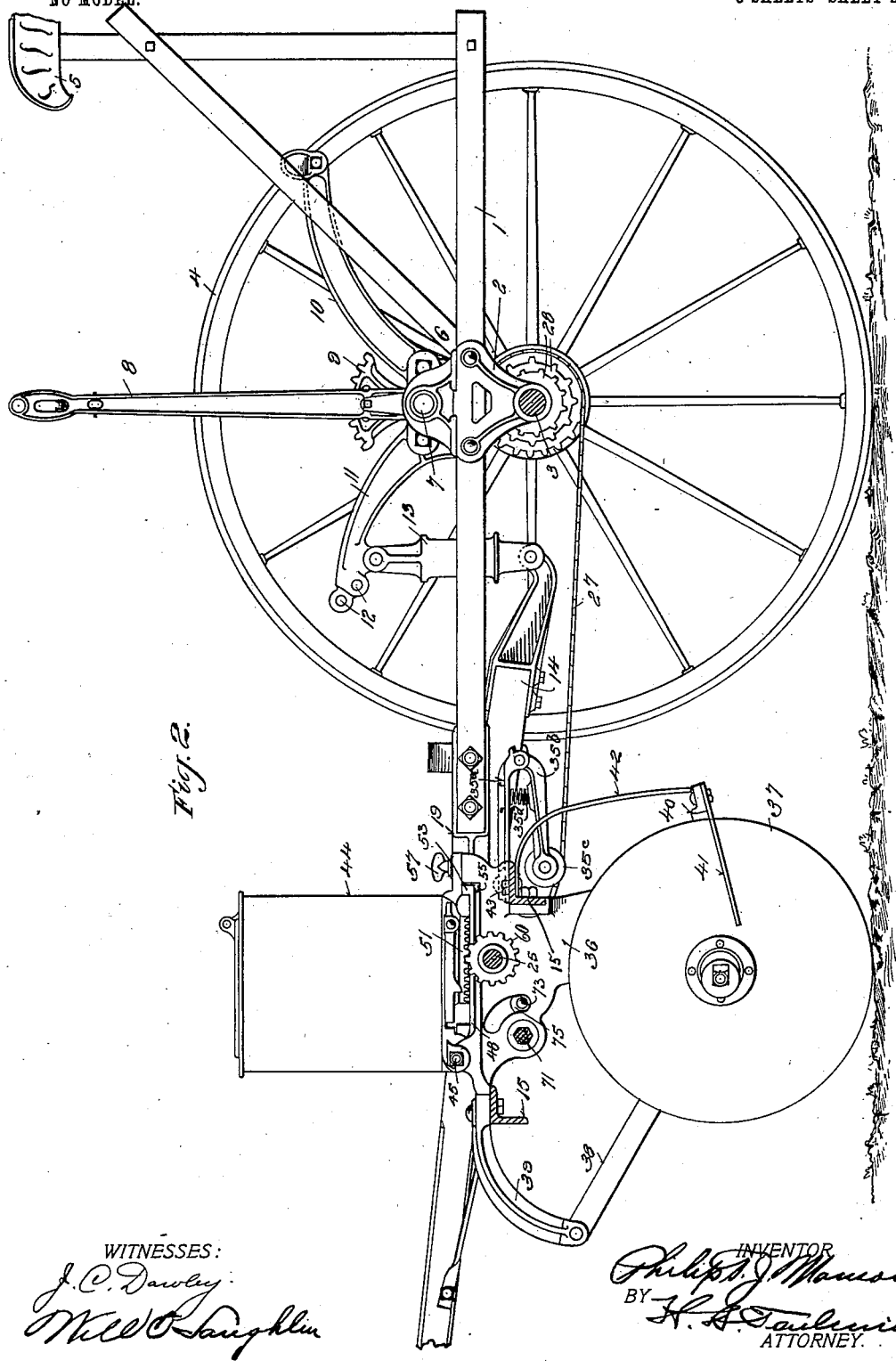

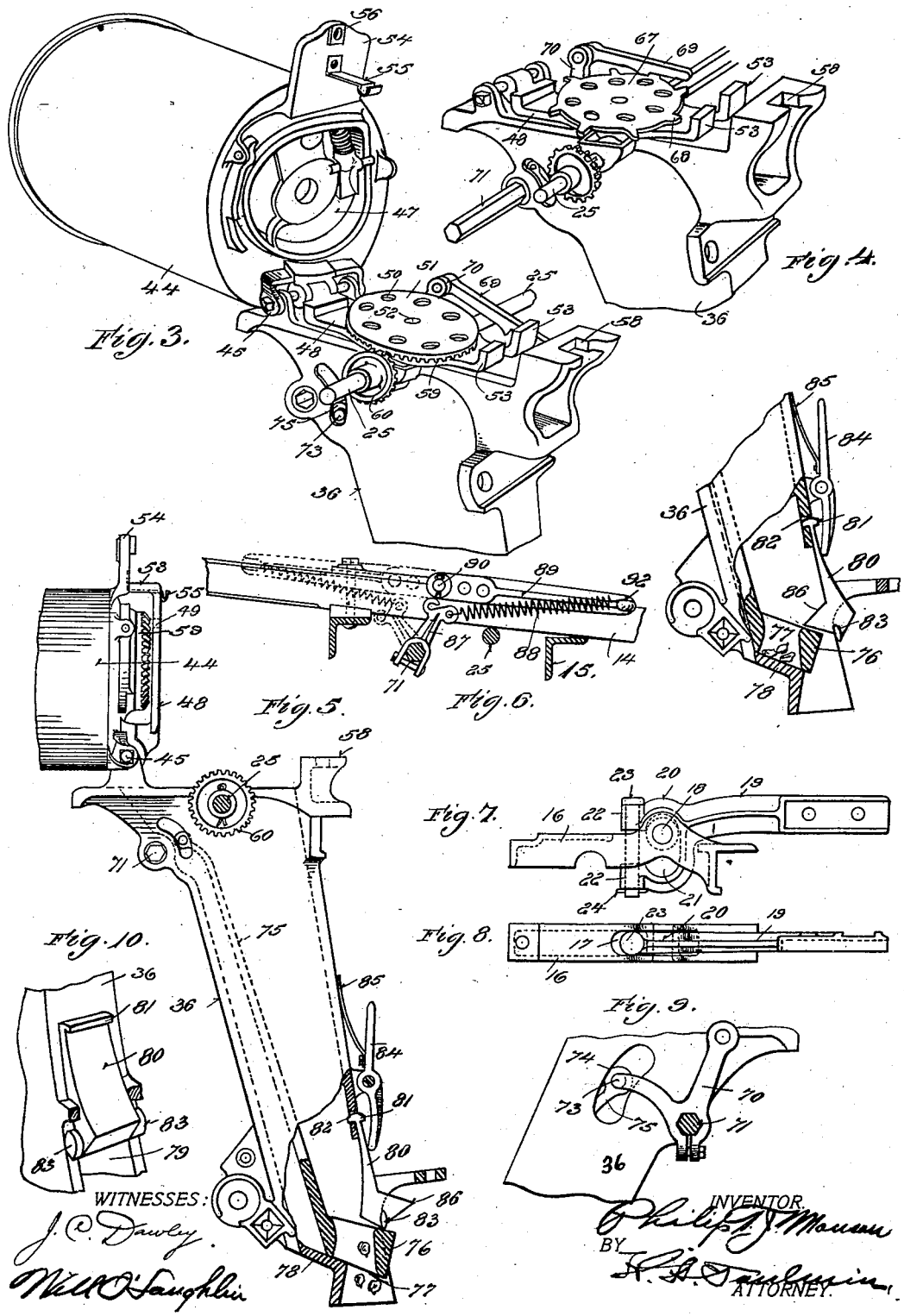

No. 730,950. Patented June 16, 1903.

UNITED STATES PATENT OFFICE.

PHILIP T. J. MONSON, OF SPRINGFIELD, OHIO, ASSIGNOR TO THE A. C. EVANS MANUFACTURING COMPANY, OF SPRINGFIELD, OHIO, A CORPORATION OF OHIO.

CORN-PLANTER.

SPECIFICATION forming part of Letters Patent No. 730,950, dated June 16, 1903.

Application filed December 4, 1901. Serial No. 84,610. (No model.)

*To all whom it may concern:*

Be it known that I, PHILIP T. J. MONSON, a citizen of the United States, residing at Springfield, in the county of Clark and State of Ohio, have invented certain new and useful Improvements in Corn-Planters, of which the following is a specification, reference being had therein to the accompanying drawings.

This invention relates to corn-planters, and has for its chief object to provide a construction whereby the mechanism may readily be changed so as to either plant continuously or after the manner of a drill or to plant in hills by means of suitable check-row mechanism.

To these and other ends my invention consists in certain novel features which I will now proceed to describe and will then particularly point out in the claims.

In the accompanying drawings, Figure 1 is a plan view of the main portions of the machine. Fig. 2 is a vertical sectional view taken on the line $x\ x$ of Fig. 1 and looking in the direction of the arrows. Fig. 3 is a perspective view of a portion of the mechanism, showing one of the hoppers or seedboxes tilted back and the mechanism arranged for continuous dropping or drilling. Fig. 4 is a view similar to Fig. 3, but with the hopper omitted and with the parts in position for check-rowing or intermittent dropping. Fig. 5 is a side elevation, partly in section, of one of the boots or conduits and its associated mechanisms, the parts being shown in position for continuous dropping or drilling. Fig. 6 is a detail sectional view taken on the line $y\ y$ of Fig. 1. Fig. 7 is a detail side elevation of one of the couplings between the front and rear frames. Fig. 8 is a plan view of the same. Fig. 9 is a detail elevation illustrating a portion of the valve-operating mechanism; and Fig. 10 is a detail perspective view, partly broken away, of the rear lower portion of one of the boots.

In the said drawings, 1 indicates the rear or wheel frame, which is provided with brackets 2 to receive a revolving axle 3, on which the ground-wheels 4 are secured. This rear frame carries at its rear end the usual driver's seat 5 and is provided with brackets 6, in which is mounted a rock-shaft 7, carrying a hand-lever 8, with which coöperates the usual locking-segment 9. A foot-lever 10 extends from the rock-shaft 7 rearward toward the driver's seat, and there extends forward from said rock-shaft an arm 11, provided with a plurality of apertures 12, to any one of which may be pivotally connected the upper end of a link 13. The other end of this link is secured to the rear end of the tongue or pole 14, and the front or runner frame 15, which carries the furrow-opening and seeding devices, is secured to this tongue. The connection between the two frames is by means of couplings, one of which is shown in detail in Figs. 7 and 8. One member of this coupling is a bridge-piece or casting 16, secured at its ends to the bars of the frame 15 and provided with a vertical opening 17, across which extends a pin 18. The other member of the coupling consists of a yoke or neck 19, provided at its forward end with a head 20, having a vertical slot or opening 21 to receive the pin 18. The head 20 passes down through the opening 17 of the member 16, and the slot 21 is of sufficient length to allow relative movement of the two frames. In order to facilitate coupling and uncoupling of the frames, the head 20 is open at its forward end, being provided with apertured jaws 22, through which passes a removable pin 23, which when in position closes the mouth of the jaws and holds the parts in engagement. This pin may be secured by means of a cotter 24 or other suitable securing device. The pin 18 is hollow or in the form of a sleeve and forms a bearing for the operating or rotating drilling-shaft 25, which is carried by the front frame. This shaft has rotary motion imparted to it by means of a sprocket-wheel 26 on the shaft 25 and a sprocket-chain 27, passing around said sprocket-wheel and around any one of a number or set of sprocket-wheels 28, mounted loosely on the axle 3. These sprocket-wheels 28 are of different sizes, so as to permit of varying the speed of the seeding-shaft 25 relatively to the axle 3. Said sprocket-wheels are so connected together as to rotate in unison, and a spring 29, coiled around the axle 3, bears against one end of the set and forces it toward the ratchet-clutch. This latter consists of a ratchet member 30, connected with the set of sprocket-wheels 28, and a ratchet member 31, carried by a sleeve 32, splined on the axle 3. This sleeve is provided with a grooved collar 33, and the foot-lever 10 and arm 11 are provided, respectively, with cams 34 and 35, which engage with the grooved collar 33, so as to shift the sleeve 32 and ratchet member 31 longitudinally on the axis. It will thus be seen that when the foot-lever 10 is depressed to lift the front frame and raise the furrow-opening devices out of the ground the sleeve 32 will be so moved as to separate the members of the ratchet-clutch, and thus arrest the motion of the seeding-shaft 25, while when the parts are returned to their working position the clutch members will reëngage and the seeding-shaft will be again driven. It will also be noticed that the teeth of the members of the ratchet-clutch are so arranged that during the forward movement of the implement or machine the seeding-shaft is rotated; but in case rotary motion in the opposite direction is imparted to the main axle 3—as, for instance, in turning or backing—then the member 31 of the ratchet-clutch will slip past the member 30, this latter yielding and compressing the spring 29 to permit this slipping, and thereby prevent any backward rotation of the seeding-shaft.

It will be observed that the shaft 25 has its axis coincident with the axes of the pins 18, which practically forms the connecting means between the two frames, so that the distance from the axle 3 to the shaft 25 remains at all times practically the same, and the sprocket-chain 27 is thus not materially affected by variations in the relative positions of the two frames. Since a chain of sufficient length to fit over the largest of the sprocket-wheels 28 must be employed, however, I provide a tensioning device or take-up (see Fig. 2) consisting of a bracket 35$^a$, secured to the front frame 15 and having pivoted to it an arm 35$^b$, carrying a tension-roller 35$^c$, which bears upon the sprocket-chain 27. A spring 35$^d$, interposed between the bracket and arm, serves to keep the tension-roller in contact with the sprocket-chain, and thus keep this latter taut.

The front frame is provided, as usual, with a furrow-opening and seed-depositing device at each end, and as these structures are identical I will describe only one, it being understood that the same description applies to both. A boot or seed tube or conduit 36 is secured at its upper end to the front frame 15 and has secured to its lower end the furrow-opening devices proper, which may be of any suitable character. I prefer, however, to employ for this purpose two disks 37, of different diameters, arranged at an angle to each other and to the line of draft, the front edge of the smaller disk lying against the rear face of the larger disk at a point below and in front of their axes and the lower edges of the two disks being in substantially the same plane, as set forth in United States Letters Patent No. 695,391, dated March 11, 1902. The boot is braced or supported by means of a brace rod or bar 38, extending upward and forward and connected to the lower end of a downwardly-curved arm 39, which extends downward and forward from the frame 15. The boot is also provided with a scraper-bracket 40, to which are connected scrapers 41, by means of which the soil is prevented from adhering to the furrow-opening disks. In order to prevent the earth which may be carried up by the ground-wheels 4 from filling and clogging the space between the disks and above the scraper-bracket 40, I employ a guard or shield 42 of a width at least equal to that of the ground-wheel, this guard or shield being secured at its upper end to the rear bar of the frame 15, being bolted thereto, as indicated at 43, and curving thence rearward and downward, terminating at the scraper-bracket 40, on which its lower end rests. To the top of each boot there is hinged a seed box or hopper 44 by means of a pivot-bolt 45 passing through suitable lugs on the hopper-bottom and on the top of the boot. The hopper is provided with a closure 46, so that when it is swung down into horizontal position the grain will not escape, and the bottom of the hopper is provided with an opening 47 for the passage of the grain to the seed-plate and with the usual cut-off.

48 indicates an auxiliary bottom plate, pivoted to the same pivot-bolt 45 as the hopper 44, said auxiliary plate being provided with an opening 49, with which the apertures 50 of the seed-plate 51 successively register. This seed-plate rests upon the auxiliary plate, which is provided with an upwardly-extending central stud 52, which fits within a corresponding aperture in the center of the seed-plate. This latter thus fits between the bottom of the hopper and the top of the auxiliary plate 48, which latter is provided at its free end with spacing-lugs 53, so as to maintain a proper distance between the under side of the hopper and the top of said auxiliary plate, the said hopper being provided with an extension 54 to rest upon said lugs 53. On the under side of the extension 54 is a downwardly-extending spring-catch 55, which when the parts are assembled passes between the lugs 53 and engages with the under side of the auxiliary plate 48, as shown in Fig. 3. The extension 54 is provided with an aperture 56, through which passes a screw-bolt 57, (see Fig. 2,) which engages a notched flange 58 on the top of the boot to secure the hopper firmly in an upright position. When this screw-bolt connection is loosened, the hopper and auxiliary plate may be swung forward in the manner shown in Fig. 5, the auxiliary plate and seed-plate preventing any escape of grain from the bottom of the hopper during this operation. The spring-catch 55 may then be released, and the auxiliary bottom plate and seed-plate may be swung back into the position shown in Fig. 3, whereupon access may be had to the seed-plate.

When the apparatus is to be used for continuous drilling, the several parts are in the positions shown more particularly in Figs. 1, 2, 3, and 5. In this operation a seed-plate 51 is employed, which is provided on its under side with bevel-gear teeth 59, and the shaft 25 is provided at each end with a corresponding bevel-pinion 60, secured thereon to impart a continuous rotary motion to the seed-plates 51. When the implement is to be used for intermittent planting in hills by means of check-row mechanism, the shaft 25, which is movable longitudinally in its bearings for that purpose, is shifted lengthwise, so as to move the bevel-pinions 60 away from the seed-plates by means of a hand-lever 61, (see Fig. 1,) pivoted at 62 on a segment-plate 63, secured to the front frame of the machine and having at its forward end a yoke to engage a grooved collar 64, secured on the shaft 25. The segment-plate 63 has two notches 65, with either one of which a locking-spring 66 may engage, so that the shaft 25 may be locked in position with its bevel-gears either in or out of position to mesh with the seed-plates. The seed-plates 51 are then removed and other seed-plates 67 substituted, said plates being provided with marginal teeth 68, which are adapted to be successively engaged by a pawl 69, pivoted to one arm of a double-armed lever 70, (see Fig. 9,) secured on a rock-shaft 71. This rock-shaft is intermittently operated by means of a suitable check-row-head mechanism 72 in a well-known manner. The other arm of the double-armed lever 70 is provided with a pin 73, (see Fig. 9,) extending through a slot 74 in the side of the boot 36, where it is pivotally connected with the upper end of a valve-rod 75. On the lower end of this rod there is formed a valve 76, having an aperture or passage 77 through the same and resting on a downwardly and rearwardly inclined shelf 78 at the lower end of the boot, on which shelf it slides. It will be observed that the lower end of the boot is slotted at the rear, as indicated at 79, and that the portion of said slot above the top of the valve 76 is closed by a reversible plate 80. In order to hold this plate in position and render it readily reversible, it is provided at its upper end with a head or enlargement 81, which is adapted to engage with a notch or opening 82 in the rear wall of the boot, while at each side of the lower end of said reversible plate there is provided a lateral projection 83, these projections bearing against the rear edges of the side walls of the boot. The reversible plate is held in position by means of a hand-lever 84, pivoted on the rear of the boot, its lower end bearing normally against the reversible plate, in which position it is held by a spring 85. It will thus be seen that by pressing on the hand-lever 84, so as to disengage the same from the reversible plate, the latter may be readily disengaged, reversed, and replaced in a reversed position. The reversible plate is provided with a cut-off projection 86, which when the device is used as a check-rower extends into the boot in the manner shown in Fig. 4, so that the valve 76 reciprocates between said cut-off projection and the shelf 78, and when the valve has moved rearward into a position to discharge the grain the cut-off will retain the grain within the boot until the valve is returned to its receiving position, as shown in Fig. 4.

When it is desired to use the appatus for continuous drilling, the plate 80 is reversed, and the rock-shaft 71 is so moved as to hold the valve in its discharging position, as shown in Fig. 5. For this purpose I secure upon the shaft 71 an arm 87, (see Figs. 1 and 6,) which is connected by means of a spring 88 to the free end of a lever 89, pivoted at 90 upon the tongue 14. The pivot 90 is above the shaft 71, so that when the lever 89 is moved to either side of a position in line with the pivot 90 and shaft 71 the tension of the spring 88 will throw the lever over in the direction in which it is inclined to the limit of its motion in that direction. In order to provide a stop for the lever 89, I prefer to form upon its free end a transverse handle-piece 91, (see Fig. 1,) one end of which extends over the tongue and will come into contact with the same when the lever has reached its limit of motion in either direction. The other end of the cross-piece 91 is preferably formed into a hook 92 to afford a ready means for connecting the spring 88 thereto. Thus when it is desired to set the machine as a continuous-drilling machine it is only necessary to move the lever 89 toward the position shown in full lines in Fig. 6 to an extent sufficient to cause it to pass beyond the line connecting the pivot 90 and shaft 71, whereupon the lever will of its own accord assume the position shown in full lines and will so move the rock-shaft 71 as to hold the valve in the position shown in Fig. 5, in which position it will remain, it being understood, of course, that the check-row mechanism is then inoperative. When, on the other hand, it is desired to use the device as a check-rower, the lever is thrown over into the position shown in dotted lines in Fig. 6, in which position the spring 88 will permit the check-row mechanism to impart the necessary oscillating motion to the rock-shaft 71.

It will be seen that the machine is so organized that the operation of changing from a drilling to a check-row machine can be very readily and quickly effected, and the same is true of the reverse change from a check-rowing machine to a drilling-machine. The plates can be readily changed without removing the seed from the hoppers and the bevel-gears readily thrown into or out of gearing position, while the reversal of the cut-off plate and the means for holding the valve in continuous-discharge position are extremely simple and readily operated. It will also be understood that the shifting of the rock-shaft into drilling position moves the pawl 69 into a position (shown in Fig. 3) in which it is out of the way of the other mechanism.

I do not wish to be understood as limiting myself to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. In a corn-planter, the combination, with a front frame having furrow-opening devices and seeding devices comprising a driving-shaft having a sprocket-wheel mounted thereon, of a tongue secured to the front frame, a rear frame provided with ground-wheels and an axle rotating therewith and carrying a sprocket-wheel, a lever mounted on the rear frame and connected to the rear end of the tongue, and a sprocket-chain connecting the sprocket-wheels on said shaft and axle, the front frame being provided with vertically-slotted bridge-pieces having bearings for the shaft, and the rear frame being provided with coupling-necks having vertically-slotted heads closed at the front by removable pins, substantially as described.

2. In a corn-planter, the combination, with a main frame having driving-wheels and an axle, and a sprocket-wheel on the latter, of a front frame having a seeding-shaft longitudinally movable in its bearings and provided with a sprocket-wheel, a sprocket-chain connecting said sprocket-wheels, a grooved collar secured on the seeding-shaft, a segment-plate mounted on the front frame and having notches at its extremities, a lever pivoted on said segment-plate and provided at one end with a yoke to engage the grooved collar and at the other end with a spring to engage the notches of the segment-plate, bevel-pinions mounted on the seeding-shaft, and seed-plates provided with bevel gear-teeth with which said pinions mesh, substantially as described.

3. In a corn-planter of the character described, the combination, with seed-dropping mechanism, of a conduit provided with an inclined shelf at its lower end and slotted at the rear, the rear wall of said conduit being provided with a notch above said slot, a valve sliding on said shelf, a rock-shaft connected with said valve to actuate the same, check-row mechanism for actuating said rock-shaft, a reversible plate having a cut-off on one side coöperating with said valve, said plate being provided at one end with a double head to engage the notch and at the other end with lugs to bear against the body of the conduit at the sides of the rear slot thereof, and a spring-actuated hand-lever mounted on the rear of the conduit and normally bearing upon said reversible plate, substantially as described.

4. In a corn-planter of the character described, the combination, with check-row heads, intermittently-rotating seed-dropping plates, and conduits provided with valves, of a rock-shaft operatively connected with said parts and provided with a projecting arm, a lever pivoted on the frame eccentrically to said rock-shaft, means for limiting the motion of said lever, and a spring connecting said lever and said arm, substantially as described.

5. In a corn-planter of the character described, the combination, with the front frame and tongue secured thereto, of a rock-shaft for operating the seed-plates and valves, said rock-shaft being provided with an arm, a lever pivoted on the tongue above the rock-shaft and extending over the tongue to form a stop, and a spring connected to said lever and to the arm of the rock-shaft, substantially as described.

6. In a corn-planter of the character described, the combination, with the front frame and tongue secured thereto, of a rock-shaft for operating the seed-plates and valves, said rock-shaft being provided with an arm, a lever pivoted on the tongue above said rock-shaft and provided with a terminal cross-piece, one end of which extends over the tongue, and a spring connected to the arm of the rock-shaft and to the other end of the cross-piece, substantially as described.

7. In a corn-planter, the combination, with a front frame having seed-distributing and furrow-opening devices, each comprising a conduit, and furrow-opening disks mounted thereon at an angle to each other and to the line of draft, said disks diverging rearwardly, of a rear frame having wheels tracking with said furrow-opening devices, and shields, one for each furrow-opener, supported between the furrow-opening devices and wheels, to prevent the space between the conduits and furrow-opening disks from being clogged, substantially as described.

8. In a corn-planter, the combination, with a front frame having seed-distributing and furrow-opening devices, comprising a conduit and furrow-opening disks mounted thereon at an angle to each other and to the line of draft, said disks diverging rearwardly, of a rear frame having wheels tracking with said furrow-opening devices, and shields, one for each furrow-opener, secured at their upper ends to the front frame and extending downward and rearward between the furrow-opening devices and wheels, to prevent the space between the conduits and furrow-opening disks from being clogged, substantially as described.

In testimony whereof I affix my signature in presence of two witnesses.

PHILIP T. J. MONSON.

Witnesses:
E. O. HAGAN,
IRVINE MILLER.